(12) United States Patent
Morrow et al.

(10) Patent No.: US 10,144,658 B2
(45) Date of Patent: Dec. 4, 2018

(54) MODULE FOR ELECTROCOAGULATING CONTAMINATED WASTE WATER

(71) Applicant: World Water Technologies, LLC., Parker, CO (US)

(72) Inventors: James Morrow, Parker, CO (US); Robert Herbst, Parker, CO (US)

(73) Assignee: World Water Technologies, LLC., Parker, CO (US)

( * ) Notice: Subject to any disclaimer, the term of this patent is extended or adjusted under 35 U.S.C. 154(b) by 0 days.

(21) Appl. No.: 15/826,996

(22) Filed: Nov. 30, 2017

(65) Prior Publication Data

US 2018/0148352 A1   May 31, 2018

Related U.S. Application Data

(60) Provisional application No. 62/428,092, filed on Nov. 30, 2016, provisional application No. 62/428,159, filed on Nov. 30, 2016.

(51) Int. Cl.
| | |
|---|---|
| *C02F 1/46* | (2006.01) |
| *C02F 1/463* | (2006.01) |
| *C02F 1/00* | (2006.01) |
| *C02F 103/00* | (2006.01) |
| *C02F 101/22* | (2006.01) |

(Continued)

(52) U.S. Cl.
CPC .............. *C02F 1/463* (2013.01); *C02F 1/004* (2013.01); *C02F 1/001* (2013.01); *C02F 1/46104* (2013.01); *C02F 2001/007* (2013.01); *C02F 2101/20* (2013.01); *C02F 2101/203* (2013.01); *C02F 2101/22* (2013.01); *C02F 2103/007* (2013.01); *C02F 2103/10* (2013.01); *C02F 2103/16* (2013.01); *C02F 2201/007* (2013.01); *C02F 2201/4611* (2013.01); *C02F 2301/08* (2013.01); *H01M 10/44* (2013.01); *H01M 2220/10* (2013.01)

(58) Field of Classification Search
CPC .......... C02F 1/463; C02F 1/46; C02F 1/4672; C02F 2001/46157; C02F 2101/22; C02F 2103/023; C02F 2103/22; C02F 2103/30; C02F 2201/4611; C02F 2301/024; C02F 2303/04; C02F 9/00; C02F 1/444; C02F 11/121; C02F 2101/308; C02F 3/348; C02F 1/00; B01D 33/70; B01D 43/00
See application file for complete search history.

(56) References Cited

U.S. PATENT DOCUMENTS 7,258,800 B1 * 8/2007 Herbst ............... B01D 17/0211
                                                    210/172.1

FOREIGN PATENT DOCUMENTS

WO    WO-2010060016 A1 *  5/2010   ............... C02F 9/00

* cited by examiner

*Primary Examiner* — Walter D. Griffin
*Assistant Examiner* — Cameron J Allen
(74) *Attorney, Agent, or Firm* — Oblon, McClelland, Maier & Neustadt, L.L.P.

(57) ABSTRACT

A module for electrocoagulation of contaminated water includes a first treatment chamber that submits the contaminated water to a first electrocoagulation current, and a second treatment chamber that submits the contaminated water to a second electrocoagulation current. The module also includes an intermediate chamber between the first and second treatment chambers that collects foam and precipitates from the first and second treatment chambers and that provides a passage for water exiting the first treatment chamber and entering the second treatment chamber.

18 Claims, 9 Drawing Sheets

(51) Int. Cl.
*H01M 10/44* (2006.01)
*C02F 101/20* (2006.01)
*C02F 1/461* (2006.01)
*C02F 103/10* (2006.01)
*C02F 103/16* (2006.01)

MODULE FOR ELECTROCOAGULATING CONTAMINATED WASTE WATER

CROSS-REFERENCE TO RELATER APPLICATION

This application claims the benefit of priority to U.S. provisional application No. 62/428,159 and to U.S. provisional application No. 62/428,092, both filed on Nov. 30, 2016, the entire contents of each of which are incorporated herein by reference.

BACKGROUND

Field of the Invention

The present disclosure describes a module for electrocoagulating contaminated waste water, and specifically to a portable, rapidly-deployable module that includes one or more cascaded stages to electrocoagulate the contaminated waste water.

Description of the Related Art

Industrial operations, farming, natural disasters, and accidents may all results in contamination of rivers, streams, and other flowing bodies of water. Such contaminants must then be removed from the water and disposed of appropriately. Therefore, there is a need for devices and systems that are able to efficiently remove contaminants from contaminated waste water.

SUMMARY

The present disclosure addresses at least some of the above-noted problems, and includes at least:

In an exemplary aspect, module for electrocoagulation of contaminated water includes a first treatment chamber that submits the contaminated water to a first electrocoagulation current, and a second treatment chamber that submits the contaminated water to a second electrocoagulation current. An intermediate chamber between the first and second treatment chambers collects foam and precipitates from the first and second treatment chambers and provides a passage for water exiting the first treatment chamber and entering the second treatment chamber.

In an exemplary aspect, the first treatment chamber includes at least one first electrocoagulation blade having a plurality of first electrodes, and the second electrocoagulation blade induces the first electrocoagulation current in water traveling therethrough.

In an exemplary aspect, the second treatment chamber includes at least one second electrocoagulation blade having a plurality of second electrodes, the second electrocoagulation blade being configured to induce the second electrocoagulation current in water traveling therethrough.

In an exemplary aspect, the first electrodes and the second electrodes are different.

In an exemplary aspect, the first electrodes and the second electrodes are the same.

In an exemplary aspect, the first electrocoagulation blade includes a plurality of spacers configured to hold the plurality of first electrodes at predetermined spacings.

In an exemplary aspect, the predetermined spacings are the same.

In an exemplary aspect, the predetermined spacings include at least one spacing that is different from others of the predetermined spacings.

In an exemplary aspect, the plurality of spacers are adjustable.

In an exemplary aspect, the second electrocoagulation blade includes a plurality of spacers configured to hold the plurality of second electrodes at predetermined spacings.

In an exemplary aspect, the predetermined spacings are the same.

In an exemplary aspect, the predetermined spacings include at least one spacing that is different from others of the predetermined spacings.

In an exemplary aspect, the first and second electrocoagulation currents are the same.

In an exemplary aspect, the first and second electrocoagulation currents are different.

In an exemplary aspect, the first electrocoagulation blade is disposed within an internal chamber of the first treatment chamber, the internal chamber having an inclined bottom to deliver precipitates to the intermediate chamber.

In an exemplary aspect, the second electrocoagulation blade is disposed within an internal chamber of the second treatment chamber, the internal chamber having an inclined bottom to deliver precipitates to the intermediate chamber.

In an exemplary aspect, the first and second treatment chambers and the intermediate chambers are formed of electrically insulating material.

In an exemplary aspect, the first treatment chamber includes a mesh filter to receive the contaminated water and to filter particles of a predetermined size.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
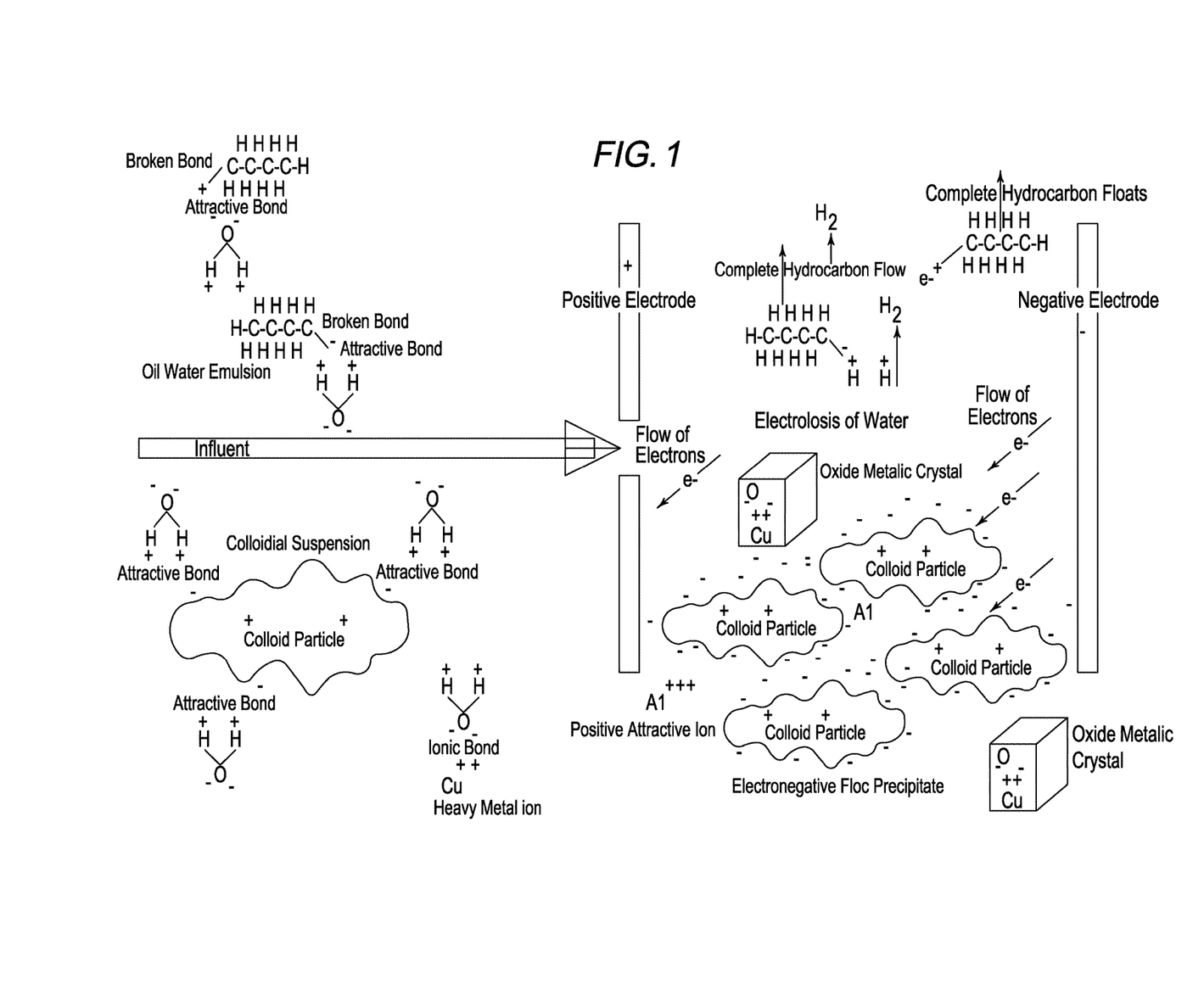
FIG. 1 is a diagram of the process of electrocoagulation according to exemplary aspects of the present disclosure.

Referring now to the drawings, wherein like reference numerals designate identical or corresponding parts throughout the several views, FIG. 1 illustrates the process of electrocoagulation according to exemplary aspects of the present disclosure. Electrocoagulation uses electricity as an electromotive force to drive chemical reactions in solutions, suspensions, emulsions, or colloidal dispersions. Such solutions, suspensions, emulsions and colloidal dispersions frequently result from cleaning, washing, and rinsing processes used by manufacturing or service companies. Examples of such solutions, suspensions, emulsions, or colloidal dispersions include municipal and/or industrial sewage or waste, refining, drilling or production waste from oil fields, or a mine spill or flood.

Electrocoagulation (EC) uses a particular form of direct current that is introduced into an aqueous influent as it passes between electrode plates of an EC module. The energy from the electricity causes a shift in equilibrium of a reaction to less than equilibrium, providing a mechanism for removing dissolved, suspended, emulsified, or dispersed elements, ions, molecules, or particles (collectively referred to herein as contaminants). The aqueous stream, after treatment, contains very minute levels of contaminants.

EC can precipitate dissolved heavy metals by a combination of oxidation/reduction reactions that in many cases produce oxide crystals that are very stable and insoluble. For example, hexavalent chromium is reduced to a precipitate of trivalent chromium, and sulfides are reacted with iron from the water itself, or from steel electrodes, to form a precipitate of ferric sulfide. Copper, lead, nickel, zinc, and other metals may also be oxidized into crystal form and precipitated out of the water. Once precipitated out of the water, the contaminants may be concentrated in a sluice and removed as sludge and recycled.

Some contaminant metals require an anion or cation to be present in order to form a precipitate. These include calcium, magnesium, molybdenum, for example. Anions and/or cations may already be present in the aqueous flow, or can be added. Adding anions or cations can also favorably adjust the pH of the water. For example, heavy metallic crystals can have a positive nucleus and attract electron rich hydroxide floc and colloidal solids into a settling precipitate. The precipitate may then be separated in a settling pond or clarifier after some of the heavy metals are classified and concentrated.

Lighter than water organic and inorganic compounds may float to the surface of a body of water that is being cleaned and collected in a weir to be diverted and handled by a separate process as one of ordinary skill would recognize. For example, these compounds may be recycled or safely disposed of.

FIG. 1 illustrates the reactions described above. The positive and negative electrodes introduce an electric current to male equilibrium shifts in the contaminants present in the water likely. Compounds that precipitate out are removed, and any unstable compound is broken down into simpler, more stable insoluble compounds.

Figure 2A:
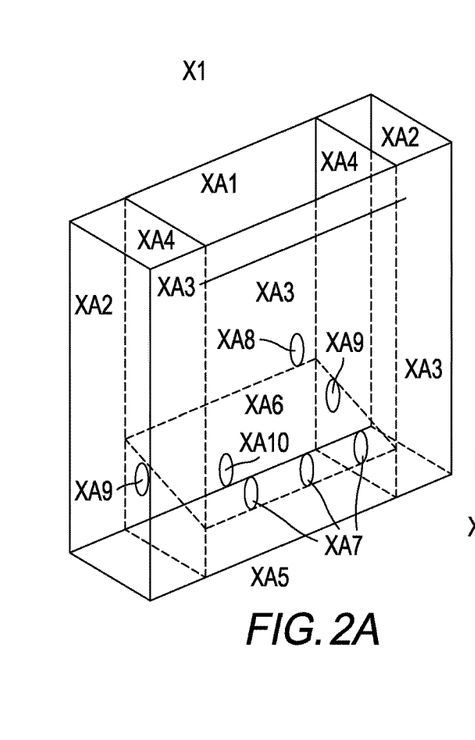
FIG. 2A is a view of a primary treatment chamber of a module for electrocoagulation of contaminated waste water according to exemplary aspects of the present disclosure.
Figure 2B:
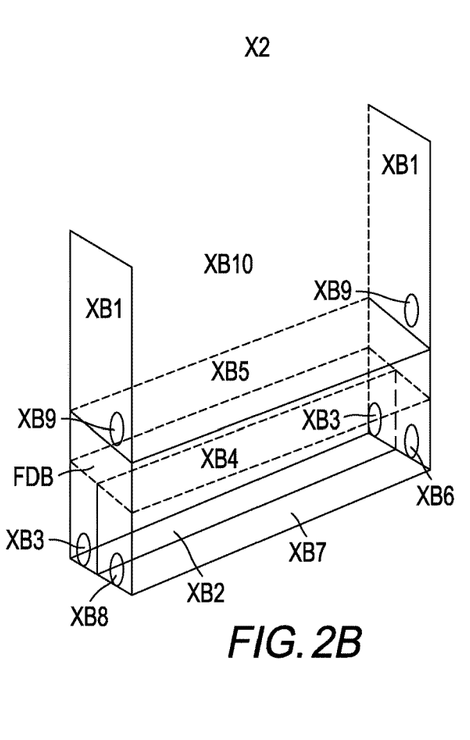
FIG. 2B is a view of an intermediate chamber of a module for electrocoagulation of contaminated waste water according to exemplary aspects of the present disclosure.
Figure 2C:
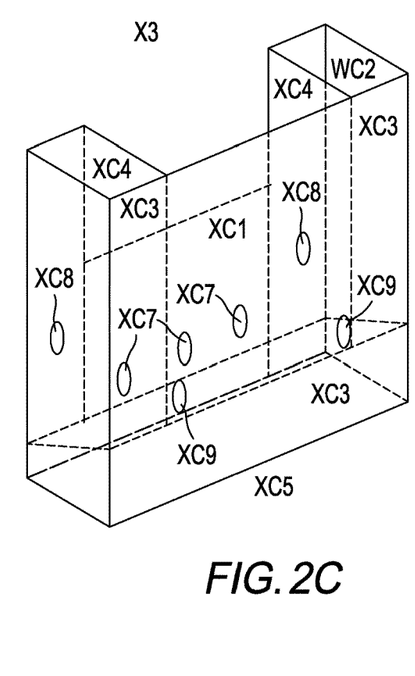
FIG. 2C is a view of a secondary treatment chamber of a module for electrocoagulation of contaminated waste water according to exemplary aspects of the present disclosure.

FIGS. 2A-2C together are an exploded three-dimensional view of an electrocoagulation module according to exemplary aspects of the present disclosure. For example, FIG. 2A is a view of the primary treatment chamber X1 of the module, FIG. 2B is a view of the intermediate chamber (or spacer) X2, and FIG. 2C is a view of the secondary treatment chamber X3. The chambers X1, X2, and X3 are cascaded together so that water flows from the primary treatment chamber X1 to the intermediate chamber X2 and to the secondary treatment chamber X3 without the need for pumps to move the water. However, pumps may also be used to cause, or at least enhance, the flow of water in the module without departing from the scope of the present disclosure. One of ordinary skill would also recognize that a module may include only the primary treatment chamber X1 or only the secondary treatment chamber X2, depending on the contaminants and the contamination level of the water. Additional treatment and intermediate chambers may also be added. Thus, the chambers and module illustrated in FIGS. 2A-2C are merely exemplary, and not limiting upon the present disclosure.

FIG. 2A is the primary treatment chamber X1 of the module according to exemplary aspects. The primary treatment chamber X1 includes a base XA5 through which water enters the module as is described in detail below. The water enters a lower chamber XA6 that includes at least one opening to allow the water to pass into one or more side chambers XA2. In FIG. 2A, the lower chamber XA6 is illustrated as having two openings XA9, but additional openings are also possible without departing from the scope of the present advancements.

From the side chambers XA2, the water enters the treatment chamber XA4 via feed holes (not shown). One or more electrocoagulation blades (not shown) are disposed within the treatment chamber XA4 in order to apply an electrocoagulation current to the water. Any precipitates that form as a result of the electrocoagulation may exit the treatment chamber XA4 through a series of openings XA7 at the bottom of a side wall of the treatment chamber XA4. To aid in the collection and removal of the precipitates, the bottom of the treatment chamber XA4 is slanted or inclined at a predetermined angle, for example 30°, 45°, or 60°. As can be appreciated, other inclination angles are also possible, and the inclination of the bottom may be fixed or adjustable without limitation. FIG. 2A illustrates the treatment chamber XA4 as including three holes XA7. However, fewer or more holes XA7 are also possible. Moreover, the holes XA7 may be slots instead of circular openings.

The precipitates that exit the treatment chamber XA4 of the primary treatment chamber X1 are collected in collection chambers XB2 and XB7 of the intermediate chamber X2. Also the side of the primary treatment chamber X1 that is adjacent to the intermediate chamber X2 is shorter than the other sides of the primary treatment chamber X1 in order to allow foam to spill into the foam collection chamber XB10 of the intermediate chamber X2. Any foam collected in the foam collection chamber XB10 is removed via the openings XB9. As can be appreciated, the foam collection chamber XB10 may include two or more openings XB9.

The precipitates collected in the collection chambers XB2 and XB7 may be removed via openings XB3 and XB6, respectively. As can be appreciated these openings XB3 and XB6 may be any shape without limitation, and more than two openings, or fewer than two openings, per chamber XB2 and XB7 may be provided. To allow the water to continue to flow, the bottom XB5 of the foam collection chamber XB10 is inclined in the direction of the secondary treatment chamber X3. The specific angle of inclination is not limiting upon this disclosure, and several different angles, 30°, 45°, or 60°, may be used. Moreover, the inclination of the bottom XB5 may be fixed, or may be adjustable as one of ordinary skill would recognize.

The water exiting the intermediate chamber X2 enters the secondary treatment chamber X3. The secondary treatment chamber X3 includes a treatment chamber XC1 in which one or more electrocoagulation blades may be disposed. The water enters the treatment chamber XC1 via one or more feed holes XC8 from the side chambers XC2 and XC4. Any precipitates that form as a result of the electrocoagulation settle at the bottom of the treatment chamber XC1 and are removed through the holes XC7. To this end, the bottom of the treatment chamber XC1 is inclined at a predetermined angle, as discussed above with respect to the other chambers, and the inclination may be fixed or adjustable. The precipitates exiting the treatment chamber XC1 via the holes XC7 are collected in the collection chambers XB2 and XB7 of the intermediate chamber X2. The treated, clean water may exit the secondary treatment chamber via one or more outflow openings XC9.

The electrocoagulation blades in the primary treatment chamber X1 and in the secondary treatment chamber X3 may be the same or may be made of different materials, or have different dimensions. For example, the electrocoagulation blade in the primary treatment chamber X1 may have a different spacing between electrodes and different material electrodes in order to remove one type of contaminant, and the electrocoagulation blade in the secondary treatment chamber may have a second spacing between electrodes and a different material electrode in order to remove another type of contaminant. Moreover, the electric current provided to the electrocoagulation blades in the primary and secondary treatment chambers may be the same or may be different without departing from the scope of the present disclosure.

Because electrocoagulation requires an electric current to flow within the module, the module should be constructed in such a way that the walls of the chambers do not react to the electric current. For example, the module and chambers may be constructed from high density polyethylene, lexan, polyvinyl chloride, fiber glass, delrin, ceramic, nylon, or other insulating material. The module can also be made from metal or aluminum and the interior of the chambers may be lined with an insulator, such as the materials described above. Moreover, the materials used to construct the module may be made from recycled plastic, such as milk jugs or water bottles. This has the added benefit of reducing pollution from those materials as well. The module may also be designed as a stand-alone portable module that can be taken to a contaminated site and rapidly deployed, or may be integrated into the waste water discharge system of a factory or plant. The module may also be integrated into the spillway of a dam, culvert, or other water diverting structure without limitation.

Figure 3:
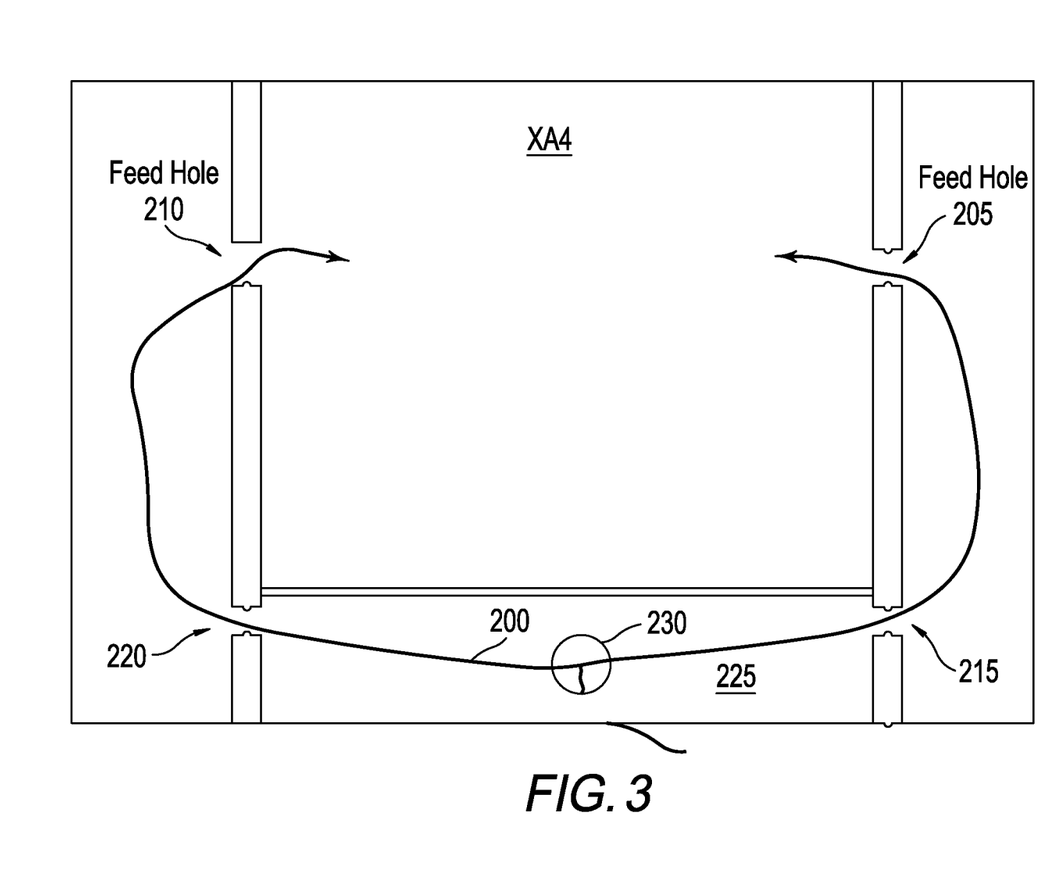
FIG. 3 is a diagram of the flow of water in the primary treatment chamber according to exemplary aspects of the present disclosure.

FIG. 3 is a cross-sectional view of water flow within the primary treatment chamber X1 according to exemplary aspect. In FIG. 3, the water flow 200 enters the lower chamber 225 of the primary treatment chamber X1 through an inlet 230. The water then travels through openings 215 and 220 into the side chambers where the water flows up to the feed holes 205 and 210. At this point the water enters the treatment chamber XA4 where it passes through the one or more electrocoagulation blades (not shown). While having water flow into the treatment chamber XA4 through two side chambers and two feed holes 205, 210 may improve overall flow by reducing flow resistance, one of the side chambers may be removed to allow for a larger treatment chamber XA4 fed by only one side chamber and one feed hole without departing from the scope of the present disclosure.

Figure 4:
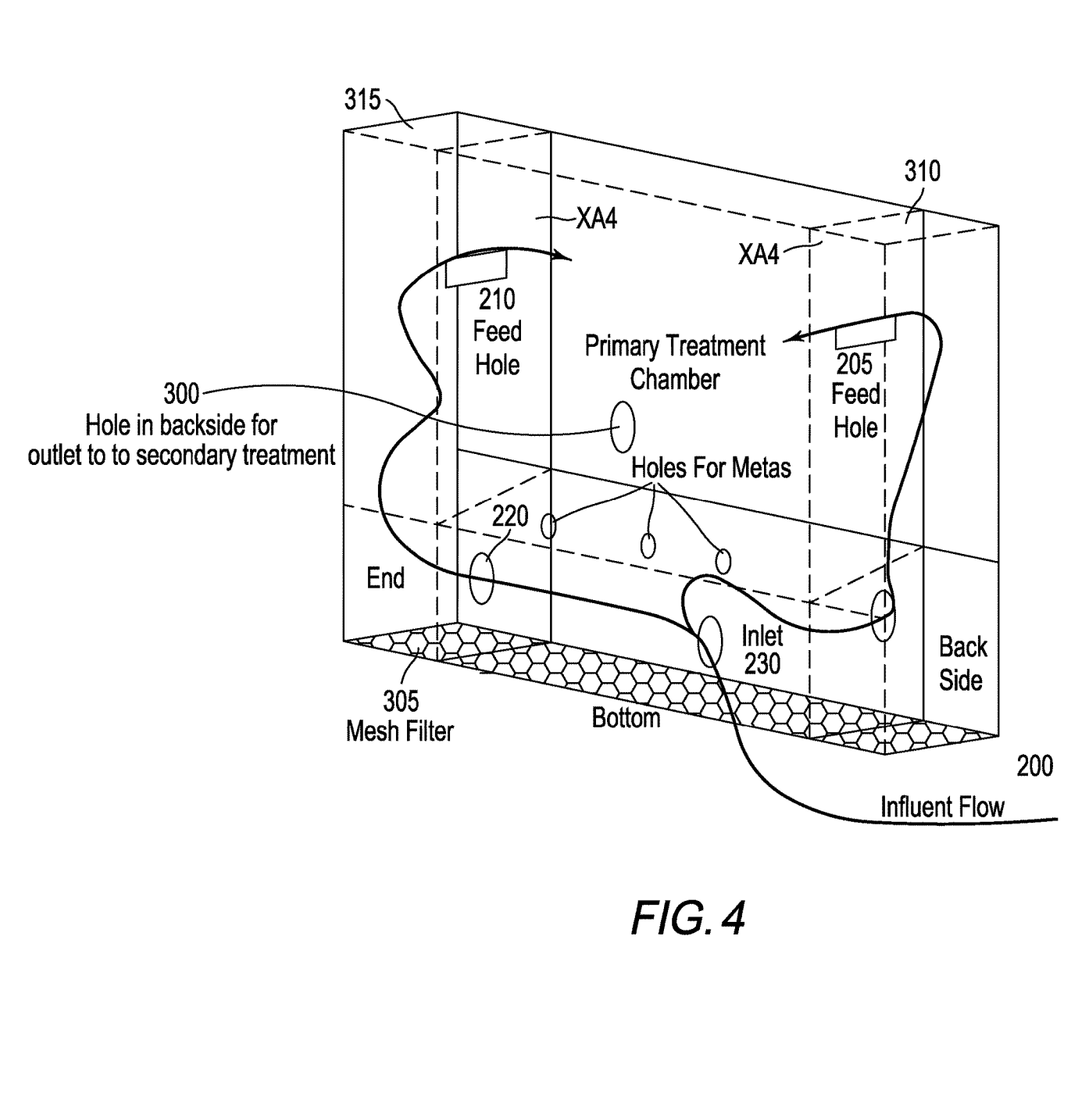
FIG. 4 is a three-dimensional view of the primary treatment chamber according to exemplary aspects of the present disclosure.

FIG. 4 is a three-dimensional view of the primary treatment chamber X1 according to exemplary aspects. As can be seen from FIG. 4, the bottom of the primary treatment chamber is made of a mesh filter 305 that separate larger particles from the water entering the module. The coarseness, or fineness, of the mesh may be selected based on application, and is not limiting upon the present disclosure. The water flow 200 then enters the lower chamber through the inlet 230 and enters the side chambers via the holes 220. The water then enters the treatment chamber XA4 via the feed holes 205, 210 as explained above. After electrocoagulation, the water exits the treatment chamber XA4 via the outlet 300.

Figure 5:
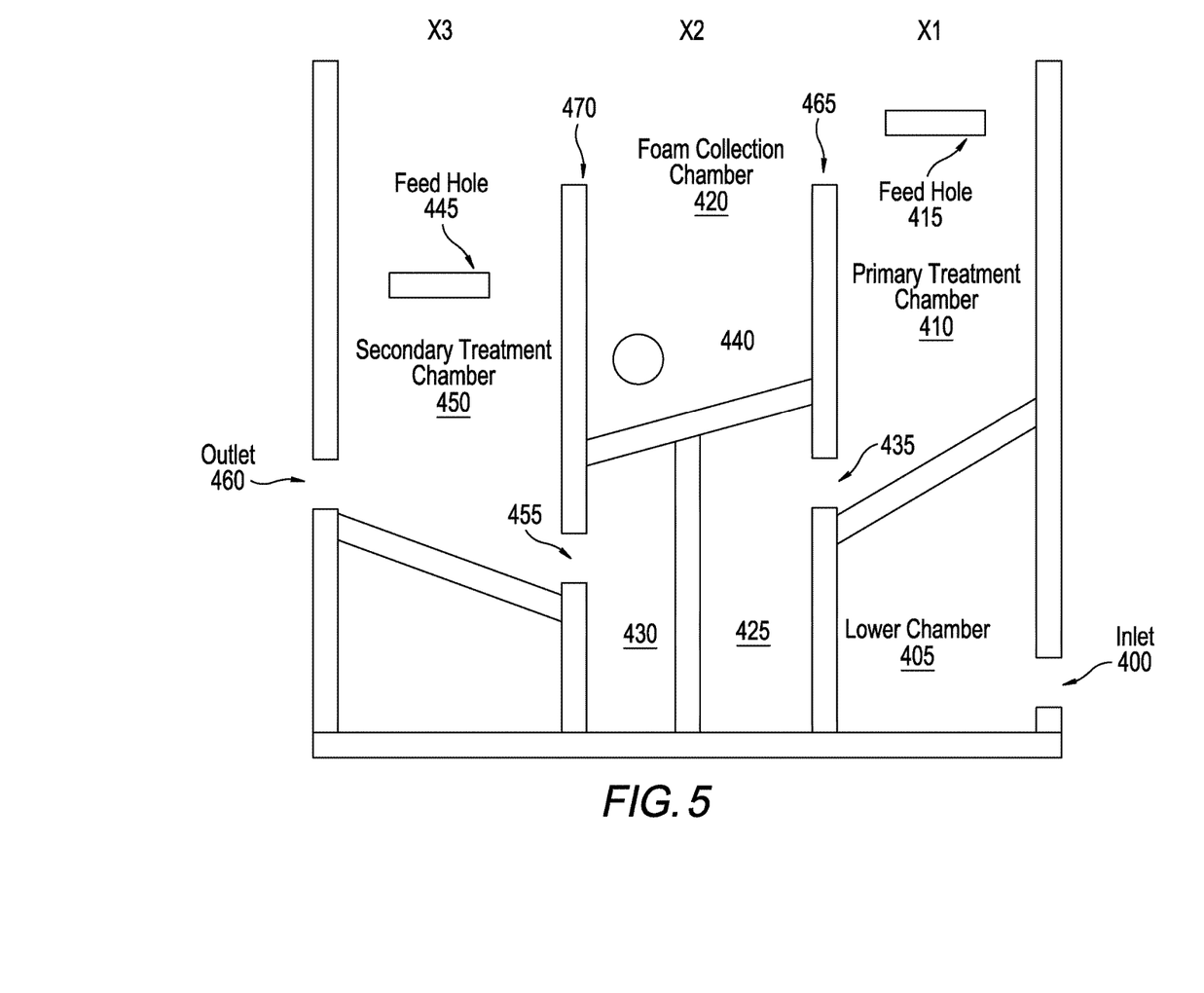
FIG. 5 is a side cross-sectional view of the module for electrocoagulation of contaminated waste water according to exemplary aspects of the present disclosure.

FIG. 5 is a cross-sectional view of an assembled module according to exemplary aspects of the present disclosure. In FIG. 5 the chambers X1, X2, and X3 share walls 465 and 470, respectively. However, to make the chambers more modular each chamber X1, X2, and X3 may have its own set of walls which butt up against the walls of adjacent chambers. Therefore, particular structure illustrated in FIG. 5 is merely exemplary.

The primary treatment chamber X1 in FIG. 5 includes at least one feed hole 415, as explained above, and at least one opening 435 through which precipitates, such as metals, are removed from the water and collected in the collection chamber 425 of the intermediate chamber X2. The lower chamber 405 of the primary treatment chamber X1 includes an inlet 400 through which untreated water flows into the module. As can be seen from the figure, the wall 465 between the treatment chamber 410 and the foam collection chamber 420 is lower to allow foam to spill over the top of this wall into the foam collection chamber 420. Any collected foam then exists through the hole 440.

The secondary treatment chamber X3 includes one or more feed holes 445 through which water enters the treatment chamber 450. Any precipitates that collect at the bottom of the treatment chamber 450 are removed via the hole(s) 455 and collected in the collection chamber 430. Cleaned water exits through the outlet 460.

Figure 6:
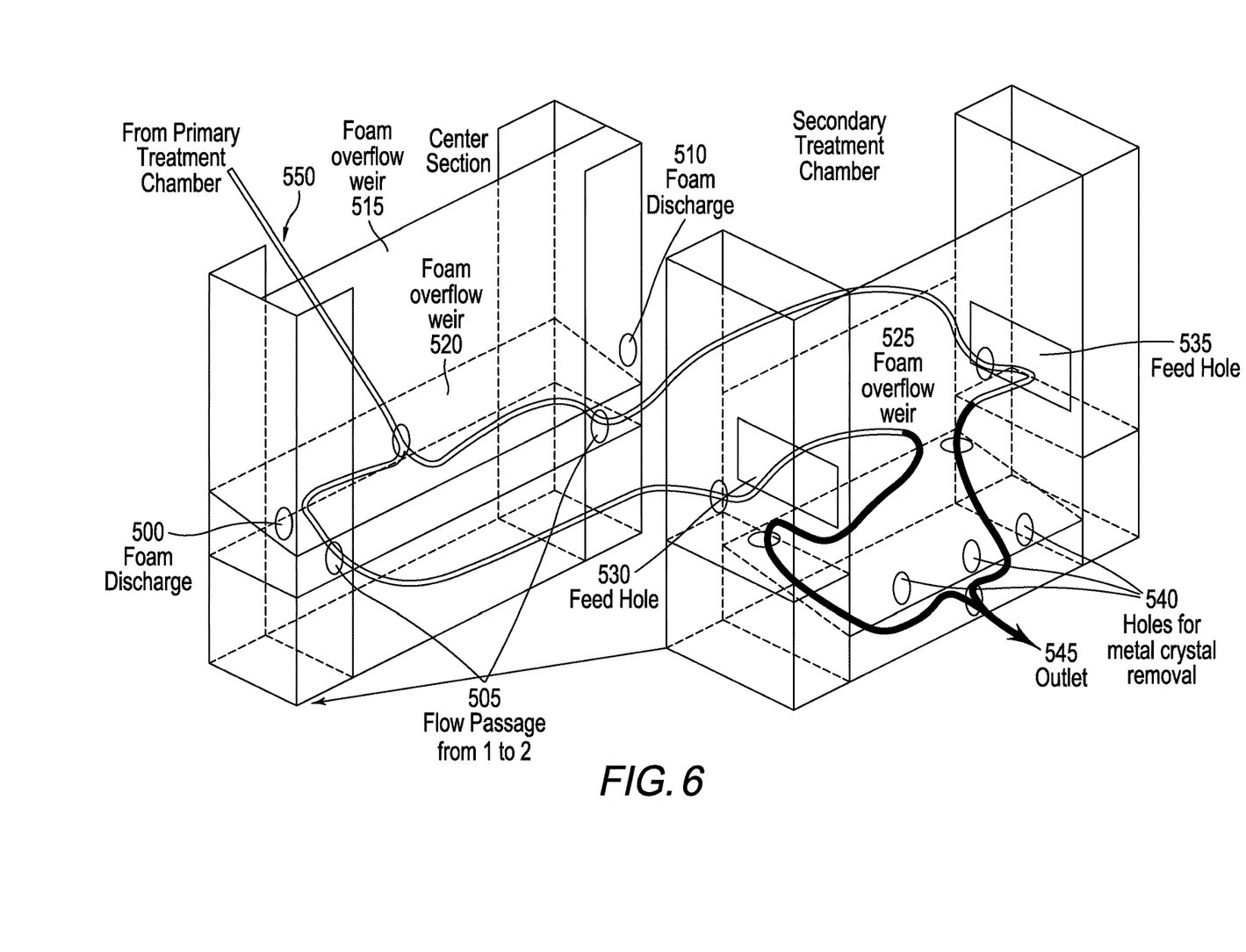
FIG. 6 is an exploded view of water flow through the intermediate and secondary treatment chambers according to exemplary aspects of the present disclosure.

FIG. 6 is a three-dimensional exploded view of the flow of water 550 through the intermediate chamber X2 and the secondary treatment chamber X3. The flow of water 550 from the primary treatment chamber X1 enters the intermediate chamber X2 through the foam collection chamber where any foam is collected and removed. The water then passes into the secondary treatment chamber via feed holes 530 and 535 where it is subjected to further electrocoagulation until clean water 545 exits through the outlet. As can be appreciated, the cascaded design of the module allows the water to flow from one chamber to the next without the need of pumping devices.

Next, the structure of an electrocoagulation blade according to exemplary aspects of the present disclosure is described with reference to FIG. 7. The electrocoagulation blade includes two outer plates 605 which sandwich one or more electrodes 665. The electrodes 665 are held between the outer plates 605 by a plurality of edge spacers 610, 615, 630, 635, 640, 645, 650, and 655 disposed along the periphery of the electrodes 665 and outer plates 605. A center spacer 600 also maintains the spacing of the electrodes 665 and outer plates 605 at the center of the electrocoagulation blade. The structure and composition of the spacers 610, 615, 630, 635, 640, 645, 650, 655, and 600 is described in detail below.

Figure 7:
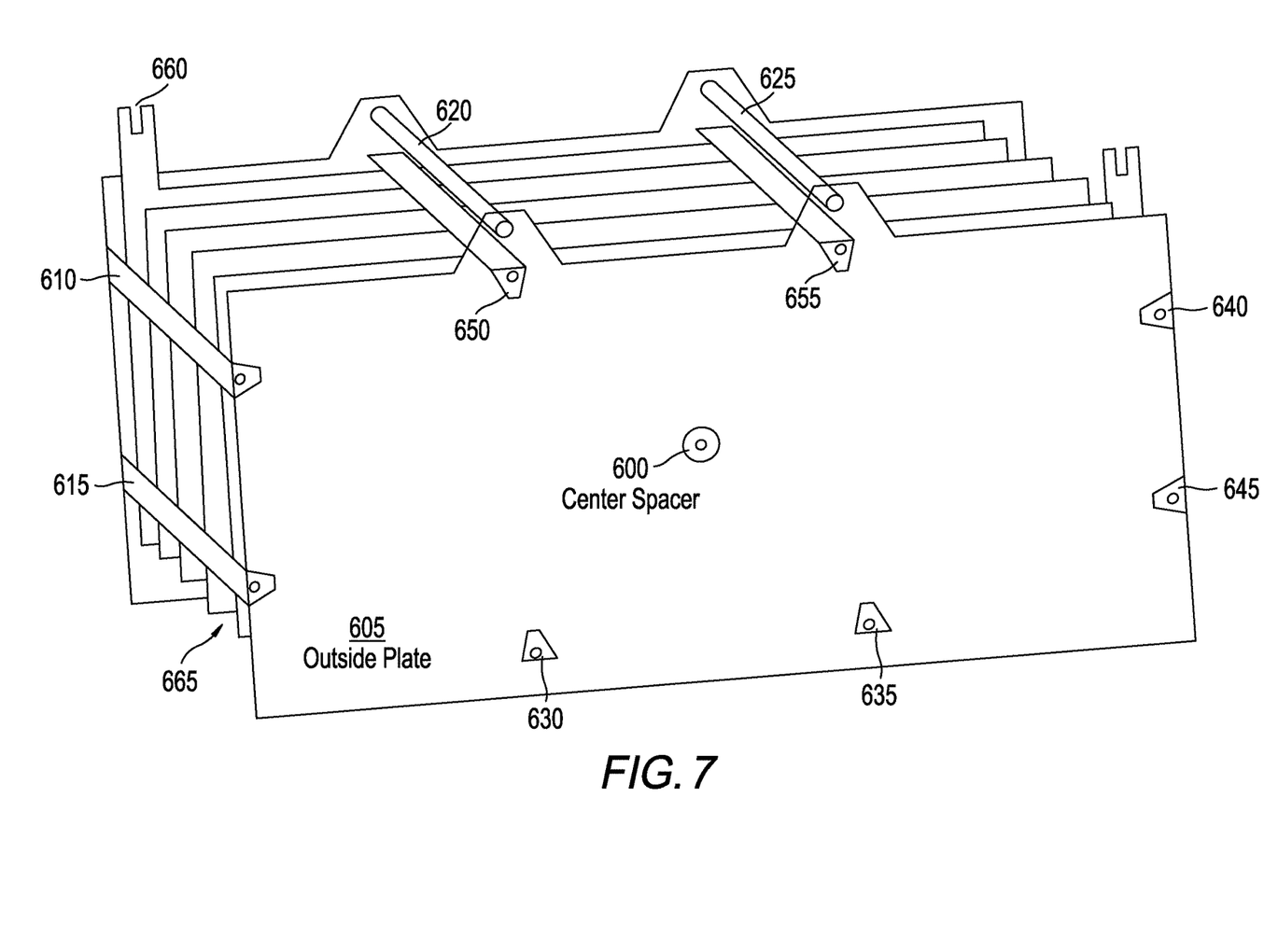
FIG. 7 is a diagram of an electrocoagulation blade according to exemplary aspects of the present disclosure.

FIG. 7 illustrates eight edge spacers 610, 615, 630, 635, 640, 645, 650, and 655, and one center spacer 600. However, fewer or more edge spacers may be used, and more than one central spacer may be used without limitation. In addition, internal spacers located within the field of the electrocoagulation blade's body, but not at its center, may also be used without limitation.

At least one electrode 665 in FIG. 7 include an attachment member 660, such as a screw slot, from which the electrocoagulation blade may be attached to a supporting member that supports the electrocoagulation blade within its corresponding treatment chamber. The attachment member 660 may also provide an electrical connection through which the electric current is provided to the electrocoagulation blade. The electric currently may also be distributed throughout the different electrodes 665 via electrically conductive members 620 and 625. As can be appreciated different electrodes 665 within the electrocoagulation blade may have different polarities in order to induce the flow of the electrocoagulation current in the water. For example, every other electrode may be positive and the remaining electrodes may be negative. The electrodes may also be formed of different materials, such as copper or zinc, and the material may be selected based on the particular contaminants present in the water to be cleaned. Other arrangements and compositions of the electrodes 665 and electrode polarities are also possible without limitation.

Figures 8A, 8B:
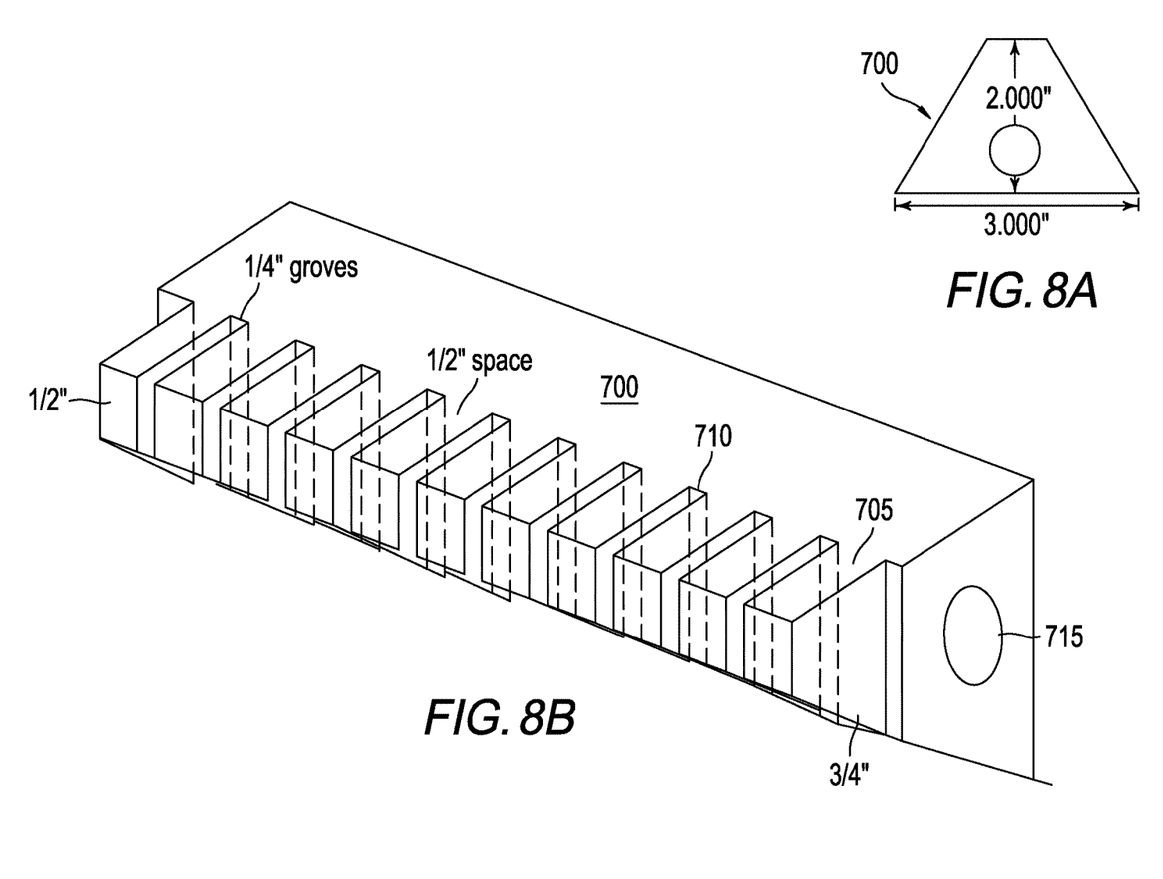
FIG. 8A is a cross-sectional view of a spacer for the electrodes in an electrocoagulation blade according to exemplary aspects of the present disclosure.
FIG. 8B is a three-dimensional view of the spacer for the electrodes of the electrocoagulation blade according to exemplary aspects of the present disclosure.

FIG. 8A illustrates a cross-section of a spacer 700 used in the electrocoagulation blade of FIG. 7. For the sake of clarity only an edge spacer is illustrated in FIG. 8A, but the following descriptions are applicable to any spacer used in an electrocoagulation blade according to the exemplary aspects of the present disclosure. In FIG. 8A, the spacer 700 has a trapezoidal cross-section where the electrodes 665 are held in notches 710 between the spacing elements 705 of the spacer 700, see FIG. 8B. The spacer 700 also includes an opening through which a fixing member such as a threaded rod may be inserted. Since different spacing may be required depending on application, different spacers 700 with different electrode spacings may be fabricated. Alternatively each spacing element 705 may be fabricated independently in a variety of widths. Thus, by stringing different width spacing elements 705 on a supporting member such as a threaded rod, a spacer 700 with the desired electrode spacings may be created. Whether fabricated as one piece or whether assembled of different spacing elements 705, the spacer 700 is made of an insulating material such as those described above. Note that the electrode spacings in a single spacer 700 may be uniform, or may differ from one slot 710/spacing element 705 pair to the next. Therefore, the spacer 700 illustrated in FIGS. 8A-8B is merely exemplary.

Figure 9:
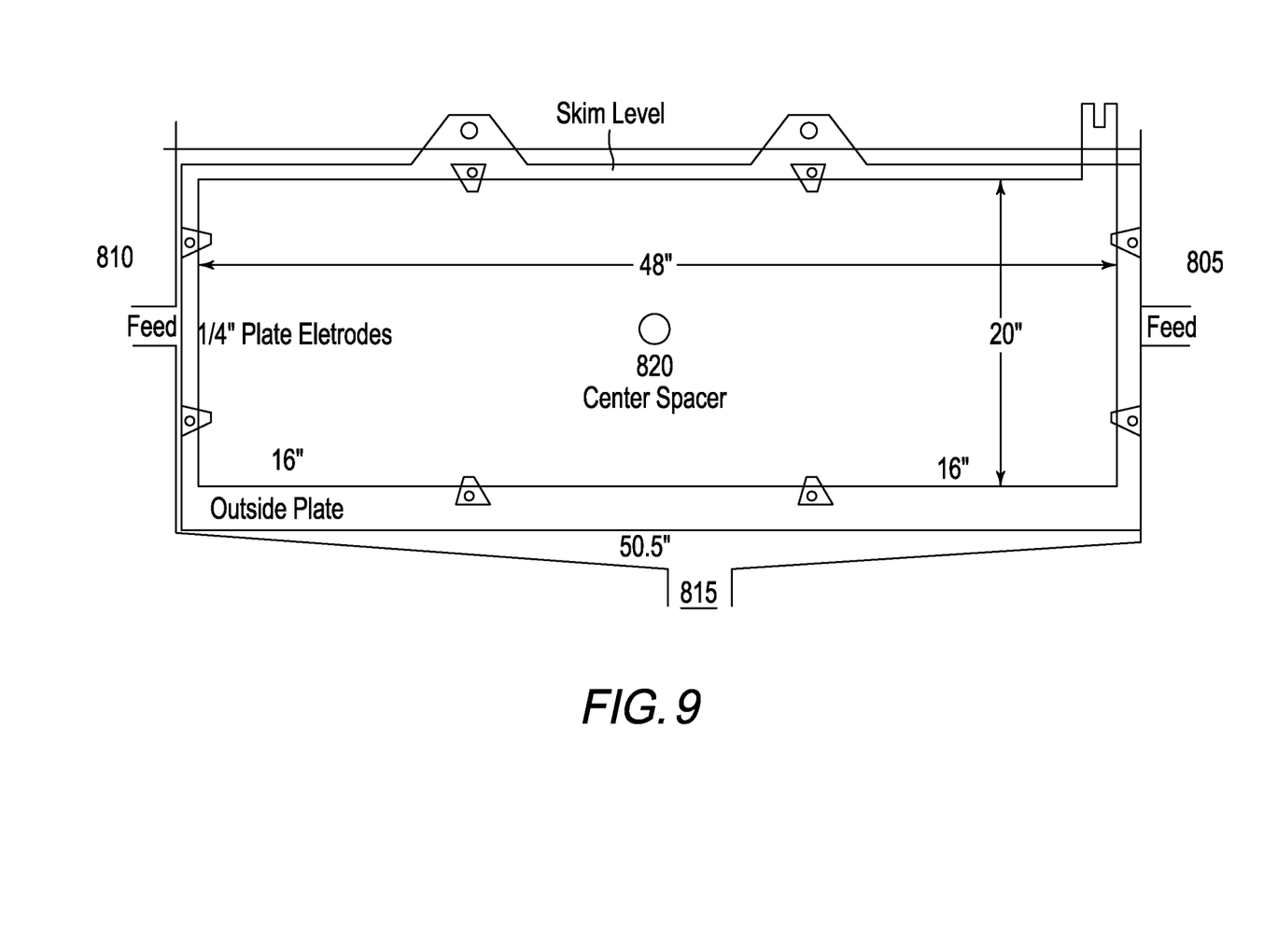
FIG. 9 is a cross-sectional view of an electrocoagulation blade according to exemplary aspects of the present disclosure.

FIG. 9 is a cross-sectional view of an electrocoagulation blade according to exemplary aspects of the present disclosure. Portions of the electrocoagulation blade, such as the edge spacers are not described further for the sake of brevity. In FIG. 9, the electrocoagulation blade includes to feeding inlets 805 and 810 through which water enters and a discharge 815 through which the water exits. This ensures an efficient flow of water through the electrocoagulation blade, and maximum contact between the water and the electrodes in the electrocoagulation blade. The electrocoagulation blade is submerged in the water to "skim level" such that at least the attachment members of the electrocoagulation blade remain above the water's surface. However, the electrocoagulation blade may also be fully submerged as one of ordinary skill would recognize.

To the extent that the descriptions herein may be considered to be organized as different embodiments, such organization is solely for the sake of clearly describing the inventive features of the disclosure. However, the features of each embodiment may be combined with the features of the other embodiments without limitation. Obviously, numerous modifications and variations of the present invention are possible in light of the above teachings. It is therefore to be understood that within the scope of the appended claims, the invention may be practiced otherwise than as specifically described herein.

The invention claimed is:

1. A module for electrocoagulation of contaminated water, comprising:
a first treatment chamber configured to submit the contaminated water to a first electrocoagulation current;
a second treatment chamber configured to submit the contaminated water to a second electrocoagulation current; and
an intermediate chamber between the first and second treatment chambers configured to collect foam and precipitates from the first and second treatment chambers and configured to provide a passage for water exiting the first treatment chamber and entering the second treatment chamber.

2. The module according to claim 1, wherein the first treatment chamber includes at least one first electrocoagulation blade having a plurality of first electrodes, the first electrocoagulation blade being configured to induce the first electrocoagulation current in water traveling therethrough.

3. The module according to claim 2, wherein the second treatment chamber includes at least one second electrocoagulation blade having a plurality of second electrodes, the second electrocoagulation blade being configured to induce the second electrocoagulation current in water traveling therethrough.

4. The module according to claim 3, wherein the first electrodes and the second electrodes are different.

5. The module according to claim 3, wherein the first electrodes and the second electrodes are the same.

6. The module according to claim 2, wherein the first electrocoagulation blade includes a plurality of spacers configured to hold the plurality of first electrodes at predetermined spacings.

7. The module according to claim 6, wherein the predetermined spacings are the same.

8. The module according to claim 6, wherein the predetermined spacings include at least one spacing that is different from others of the predetermined spacings.

9. The module according to claim 6, wherein the plurality of spacers are adjustable.

10. The module according to claim 3, wherein the second electrocoagulation blade includes a plurality of spacers configured to hold the plurality of second electrodes at predetermined spacings.

11. The module according to claim 10, wherein the predetermined spacings are the same.

12. The module according to claim 10, wherein the predetermined spacings include at least one spacing that is different from others of the predetermined spacings.

13. The module according to claim 1, wherein the first and second electrocoagulation currents are the same.

14. The module according to claim 1, wherein the first and second electrocoagulation currents are different.

15. The module according to claim 2, wherein the first electrocoagulation blade is disposed within an internal chamber of the first treatment chamber, the internal chamber having an inclined bottom to deliver precipitates to the intermediate chamber.

16. The module according to claim 3, wherein the second electrocoagulation blade is disposed within an internal chamber of the second treatment chamber, the internal chamber having an inclined bottom to deliver precipitates to the intermediate chamber.

17. The module according to claim 1, wherein the first and second treatment chambers and the intermediate chamber are formed of electrically insulating material.

18. The module according to claim 1, wherein the first treatment chamber includes a mesh filter to receive the contaminated water and to filter particles of a predetermined size.

* * * * *